United States Patent [19]

DePedro et al.

[11] 3,882,277

[45] May 6, 1975

[54] ELECTROCARDIOGRAPHIC TELEMETRY AND TELEPHONE TRANSMISSION LINK SYSTEM

[75] Inventors: Donald DePedro, Millis; Robert Cannon, Waltham, both of Mass.

[73] Assignee: American Optical Corporation, Southbridge, Mass.

[22] Filed: Apr. 20, 1972

[21] Appl. No.: 246,053

[52] U.S. Cl......... 179/2 DP; 128/2.1 A; 128/2.06 R; 340/207

[51] Int. Cl. ............................................ H04h 11/06

[58] Field of Search.................... 128/2.1 A, 2.06 R; 179/2 DP, 2 R, 2 A, 6 AC; 325/118; 340/177, 207

[56] References Cited

UNITED STATES PATENTS

| | | | |
|---|---|---|---|
| 3,619,507 | 11/1971 | Metz | 179/1 C |
| 3,715,504 | 2/1973 | Piott | 179/6 AC |

OTHER PUBLICATIONS

Combined Telephone and Radiotelemetry of the EEG by Hanley et al., Electroencephalography & Clinical Neurophysiology (1969) p. 323, 324.

*Primary Examiner*—Kathleen Claffy
*Assistant Examiner*—Thomas D'Amico
*Attorney, Agent, or Firm*—Joel Wall; William C. Nealon; Howard R. Berkenstock, Jr.

[57] ABSTRACT

There is disclosed a combined telemetry and telephone transmission link system for monitoring a physiological signal. A convalescing patient, after leaving the intensive care unit of a hospital, carries with him a portable, battery-powered ECG signal detector and transmitter. The signal is frequency modulated and transmitted to a telemetry receiver, typically in the same room. The signal is demodulated and then coupled over a telephone link (for example, the hospital private branch exchange system) to monitoring equipment at another location. Hookups to the two ends of the telephone link are accomplished with the use of snap-on telephone attachments.

6 Claims, 4 Drawing Figures

ELECTROCARDIOGRAPHIC TELEMETRY AND TELEPHONE TRANSMISSION LINK SYSTEM

This invention relates to the monitoring of physiological signals, and more particularly to combined telemetry and telephone links therefor.

Post-coronary care patients are not usually monitored, even when they remain in the hospital, because they are ambulatory and a wired system would be an inconvenience. Also, since the risk of another heart attack is small, it would place an unnecessary burden on the nursing staff to watch patient monitors for random and rare electrocardiographic events of interest.

However, the automatic ECG arrhythmia monitors which have been developed recently can detect ectopic beats and they can plot trends of rhythm changes, these being early signs of more serious arrhythmias. Since such equipment is highly automated, and a single nurse can often monitor the signals from many different patients, it would be advantageous to monitor ECG and other physiological signals of ambulatory patients.

There are also other situations in which it may be inconvenient to use a wired monitor system. For example, precoronary care serves to screen patients for susceptibility to sudden cardiac death. One of the screening tests is to monitor the ECG signal of a patient while he undergoes exercises on a bicycle, treadmill, etc. In many of such tests it is not feasible to wire the patient to a monitoring system.

One technique which can be used to monitor an ambulatory patient is that of biotelemetry. The patient may carry a small transmitter, which is wired to him to pick up a physiological signal and which transmits it to a receiver, the output of which is coupled to monitoring equipment. Unfortunately, the biotelemetry approach is often impractical. For example, consider a post-coronary care patient who carries a small transmitter on him for transmitting a physiological signal to a nearby receiver. The signal might be displayed on an osciliscope, but for proper monitoring a nurse would have to be stationed in front of the monitor. Even were a number of monitors included at a single station, this would require all of the ambulatory patients to be confined in the immediate vicinity of that location. Furthermore, to avoid interference between signals, relatively complex and expensive transmitters and receivers would have to be used.

It is a general object of our invention to provide for the monitoring of a physiological signal of an ambulatory patient which overcomes the shortcomings of the conventional biotelemetry technique.

In accordance with the principles of our invention, the patient carries a portable transmitter which transmits the physiological signal of interest. A receiver detects the signal and converts it to a form (low band-pass) suitable for transmission over a telephone link. The electrical signal is then converted to an acoustic signal which, by means of a clip-on attachment for the mouthpiece of a telephone receiver, is coupled to a telephone link. The terminal end of the telephone link is provided with another clip-on attachment which converts the acoustical output from the telephone link to an electrical signal. This electrical signal is then utilized to drive a display or some other type of monitor.

As utilized in a hospital, for example, the telemetry receiver might be positioned in the patient's room or in a lounge in which he is sitting. The telephone link simply would be a connection through the hospital private branch exchange to a telephone in the intensive care unit. At that location, a number of telephones would be provided, with an ECG signal for a different patient coming in over each phone. All of the signals would be displayed at this central location — a location at which trained personnel are ordinarily found. The technique can even be extended and used for a patient who is convalescing at home. The patient might be coupled via the telemetry link to the telephone in his home, with a telephone connection being established from his phone to another in a hospital intensive care unit or in some other central location. By combining the telemetry and telephone links in this manner, great flexibility is possible with little inconvenience to the patient.

It is important to note that practical telemetry links and conventional telephone links have completely different frequency requirements. For successful telephone transmission the transmitted signal must be within the telephone bandpass of approximately 3 kHz. For reliable and relatively long-distance telemetry, however, what is required is a radio frequency signal. The two incompatible frequency requirements are satisfied by providing the telemetry receiver with circuitry for converting an RF signal to an audio signal.

There is yet the problem, however, of coupling the audio signal to the telephone link, and coupling the same signal from the telephone link to the monitoring equipment. The audio signal at the output of the telemetry receiver is an electrical signal and ordinarily there would have to be electrical coupling of the signal to the telephone line. This would greatly reduce the flexibility of the system; for example, were a patient to carry a transmitter and receiver with him to a new location, he could not connect the receiver to a telephone link without calling in a technician. To maximize flexibility of the system, we provide a clip-on electrical-acoustical or acoustical-electrical coupler at each end of the telephone link. The coupler is simply a housing with a small built-in microphone, the housing being suitable for clip-on attachment over either the mouthpiece or the earpiece of a telephone handset. At the transmitting end of the telephone link, the attachment is clipped onto the mouthpiece and the microphone leads are connected to the output of the telemetry receiver. The audio electrical signal is converted to an acoustical signal within the housing of the attachment and the acoustical signal is then re-converted to an electrical signal for transmission over the telephone link within the telephone handset. At the other end of the telephone link, the attachment is connected to the earpiece of the handset. The acoustical output is converted to an electrical signal within the microphone of the attachment, and the electrical signal (after subsequent processing) is used to drive a display or some other form of monitoring eqiupment. Although the attachments at the two ends of the telephone link are coupled to different parts of a handset (mouthpiece and ear-piece) and although one functions as an acoustical-electrical converter and the other functions as an electrical-acoustical converter, both attachments may take the same form.

An added advantage of the arrangement is that related (or even unrelated) voice communication can take place over the telephone link. The converter attachment for a telephone handset includes a push-button switch the contacts of which are connected in series with the microphone leads. When the button is pressed, the microphone circuit is broken. Suppose, for example, that a physician, after observing an ECG signal on the oscilloscope at a remote location, desires to talk to the patient. In such a case, the physician simply speaks into the mouthpiece of his phone (the acoustical-electrical converter at the monitoring end of the overall link is attached to the earpiece) and his voice is heard in the earpiece at the patient's end of the telephone link (the electrical-acoustical converter at the patient end of the link is attached to the mouthpiece). Assuming that the patient is close enough to the earpiece to hear the physician — which he certainly is if he has placed a call to the physician because he is uncomfortable and for the express purpose of asking the physician to observe his ECG signal — he simply pushes the button on his telephone attachment. The attachment is provided with through-holes so that an acoustical signal can be extended to the mouthpiece through the attachment. The patient can thus speak into the mouthpiece without even removing the attachment, and there is no interference from the ECG signal because the pushing of the button breaks the microphone connection. Similarly, at the physician's end of the telephone link, the physician can hear the patient's voice through the attachment which is coupled over his earpiece. (There is no need for the physician to press his button since if the microphone continues to operate all that happens is that some form of the voice signal is extended to the monitor. The physician's phone attachment, if it includes a push button, includes one primarily so that the same attachment can be used at both ends of the telephone link.)

Further objects, features and advantages of our invention will become apparent upon consideration of the following detailed description in conjunction with the drawing, in which.

Figures 1, 2A, 2B, 3:
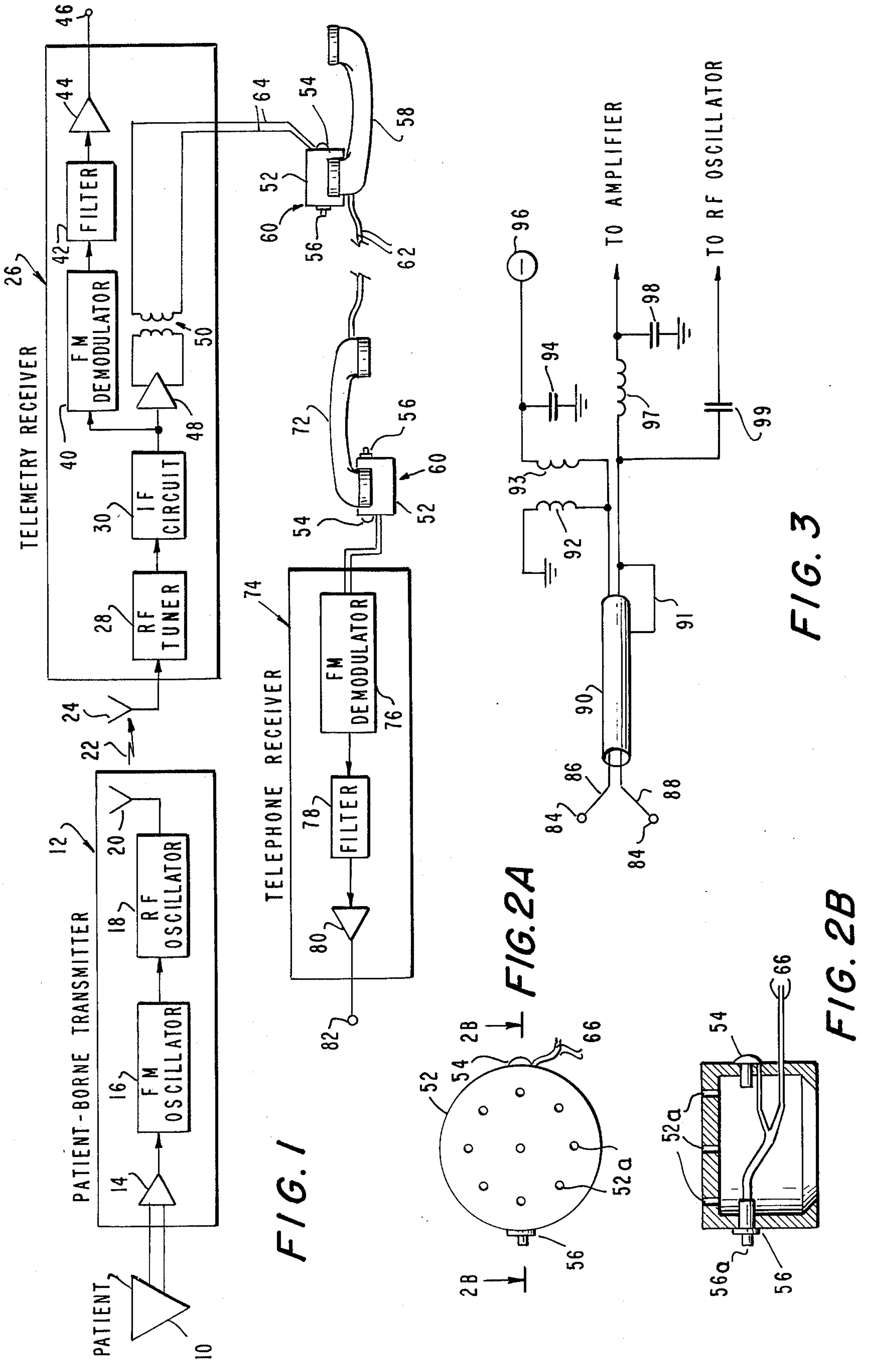
FIG. 1 depicts schematically the illustrative embodiment of our invention.
FIG. 2A is a plan view of a telephone attachment, two of which are utilized in the system of FIG. 1.
FIG. 2B is a cross-sectional view of the telephone attachment taken through the line 2B—2B of FIG. 2A.
FIG. 3 depicts the antenna portion of the patient-borne transmitter unit 12 of the system of FIG. 1.

Referring to FIG. 1, patient 10 carries with him a portable, battery-operated transmitter 12. The transmitter includes an input amplifier 14 for amplifying a physiological signal, an FM modulator 16, and an RF oscillator which is frequency modulated in accordance with the output of the modulator. The oscillator output is coupled to antenna 20 which transmits the telemetry signal, as shown by arrow 22, to receiving antenna 24 on telemetry receiver 26. (Although FIG. 1 shows the electrode leads which connect patient 10 to amplifier 14 as being distinct from transmitting antenna 20, as will be described with reference to FIG. 3, the input leads and the antenna are one and the same in the preferred embodiment of the invention.)

The FM modulator 16 generates a 1.2-kHz carrier which is frequency modulated in accordance with the instantaneous amplitude of the signal being monitored. The RF oscillator 18 generates a carrier signal in the 88–108 MHz range. This carrier is frequency modulated by the frequency-modulated 1.2-kHz signal at the output of modulator 16. The system thus incorporates FM-FM transmission. The 1.2-kHz FM signal serves as a sub-carrier frequency. There are several reasons for using FM-FM transmission and a sub-carrier frequency in the audio range.

First, if the physiological signal itself were to directly modulate the RF carrier, it might be difficult to interconnect the telemetry and telephone links. An ECG signal, for example, is characterized by frequencies below 100 Hz, and if the ECG signal is used to directly modulate the RF oscillator and the demodulated signal is coupled to the telephone link, there would be considerable distortion during the telephone transmission because the telephone line does not have a linear characteristic at such low frequencies. But by providing a 1.2-kHz sub-carrier, after the RF demodulation in the telemetry receiver the 1.2-kHz frequency modulated signal can be transmitted from the output of the telemetry receiver over the telephone link with little distortion.

Furthermore, when tuning the telemetry receiver, since the output of the receiver is a frequency modulated signal with a 1.2-kHz carrier frequency and the output of the telemetry receiver is coupled to a microphone in the telephone attachment, an audible tone can be heard when the receiver is tuned properly. This greatly simplifies the tuning procedure because an operator need merely turn a tuning dial until the loudest audio tone is heard. Another important reason for providing a sub-carrier is that if a non-crystal controlled transmitter is used, the RF tuner is preferably equipped with an automatic frequency control circuit to keep it in tune. If the technique is employed without utilizing a sub-carrier, distortion of the signal can result.

In the illustrative embodiment of the invention, the patient-borne transmitter is adjusted to have a range of approximately 50 feet (line of sight). The actual range depends upon the posture of the patient and the environment. In any particular case, the range should be sufficient so that the patient is not too severly restricted in movement.

Amplifier 14, FM modulator 16 and RF oscillator 18 can be conventional circuits. Typically, the RF oscillator is of the Colpitts type and the oscillator should be RF isolated from the rest of the transmitter. The FM modulator is preferably a relaxation oscillator of low duty cycle, the rate of the pulses varying around the 1.2-kHz center frequency in accordance with the instantaneous amplitude of the ECG signal. Amplifier 14 is preferably a two-stage amplifier employing both current and voltage feedback for bias and stability. Although ECG amplifiers in general are designed to have very high input impedances, to achieve a high input impedance requires additional stages and more complex bias arrangements. Since the patient-borne unit should be as small and light as possible, a compromise input impedance of 200 kohms was used in one illustrative embodiment of the invention.

The transmitting antenna 20 should be an integral part of the transmitter. Dangling wires or loops of wires around the patient are not desirable. For this reason it is desirable to use the electrode wires themselves for the antenna. A preferred arrangement is shown in FIG. 3. The two electrodes 84 are connected over conductors 86 and 88 to the patient-borne transmitter. They are shielded by shield 90 and the shield is coupled by wire 91 to conductor 88. The length of the conductors 86 and 88 between the electrodes and the shield is 6 inches, and the length of the shield is 18 inches. Conductor 86 is connected to ground through inductor 92, and it is connected through inductor 93 to the negative terminal 96 of the transmitter battery. Capacitor 94, connected across the battery, and inductors 92 and 93 serve as a filter for the battery. The input to the amplifier is extended through a filter comprising inductor 97 and capacitor 98. Another capacitor in series with the amplifier input (not shown) can be employed to provide AC coupling so that the offset potential from the electrodes is eliminated. The output from the RF oscillator is coupled through capacitor 99 to conductor 88. Inductor 97 and capacitor 98 prevent the RF oscillator output from being fed back to the input of the amplifier. Because the RF oscillator output is coupled to the input conductors, it is apparent that a separate antenna is not required; the input leads double in the capacity of an antenna. In general, it has been found that the length of the input leads should be chosen to be equal to one quarter of the wavelength of the RF carrier.

The telemetry receiver 26 is also made of standard blocks of equipment. The RF signal picked up by antenna 24 is fed to the input of RF tuner 28. The antenna may be of the whip type. The RF signal at the output of the tuner is coupled to the input of IF circuit 30 and this circuit functions to recover the frequency modulated 1.2-kHz sub-carrier signal. The signal is then demodulated by FM demodulator 40 to derive the information signal. The signal is filtered by filter 42 to eliminate the sub-carrier harmonics and then amplified by amplifier 44. The final signal at terminal 46 can be used to drive some form of display in the event that the telephone link is not employed, or if in addition to transmitting the ECG signal over the telephone link it is desired to display it in the vicinity of the telemetry receiver.

The frequency-modulated 1.2-kHz signal at the output of IF circuit 30 is amplified by amplifier 48, the output of which drives the primary winding of transformer 50. The secondary winding is connected to output conductors 64. The signal on the output conductors is thus a frequency modulated carrier of 1.2 kHz. This signal is suitable for transmission over the telephone link but first it is necessary to conveniently couple it to the link.

This is accomplished with the use of attachment 60 shown in greater detail in FIGS. 2A and 2B. The attachment has a housing 52 of molded phenolic material, the bottom opening of which is tapered slightly as shown in FIG. 2B so that it can be fitted and held on the mouthpiece or earpiece of a telephone handset. In the side wall of the housing there is a dynamic coil speaker (e.g., Lafayette No. 407801 dynamic earphone). This unit functions as a speaker when connected to telephone 58 in FIG. 1 and as a microphone when connected to telephone 72. Fixed to the housing is a push-button switch 56. One terminal of the switch is connected to one terminal of the coil, and the other terminal of the coil and the other terminal of the switch are connected to conductors 66 which extend out of the housing. Through-holes 52*a* provide acoustical coupling through the housing. When attached to the mouthpiece of telephone 58, the patient can speak and his voice is coupled through the attachment to the mouthpiece, and when attached to the earpiece of telephone 72, the physician can listen to the voice of the patient through the attachment.

The electrical signal on conductors 64 (in the audio range and centered around 1.2 kHz) is converted to an acoustical signal in the attachment 60 mounted on the mouthpiece of telephone 58, and an electrical signal is transmitted over telephone link 62 to telephone 72. The acoustical signal at the earpiece of the telephone is converted in the attachment mounted on it to an electrical signal which is extended to the input of telephone receiver 74. The FM demodulator 76, filter 78 and amplifier 80 in the telephone receiver serve the same functions as units 40, 42 and 44 in the telemetry receiver. The output of the telephone receiver, which appears on terminal 82, can then be used to drive a display or some other form of monitoring equipment.

The FM demodulator is of a conventional type. The signal transmitted over the telephone link consists of fixed-width, fixed-amplitude pulses whose repetition rate varies in accordance with the instantaneous amplitude of the ECG signal. In effect, the FM demodulator derives the average value of the pulse waveform. The average value is proportional to the repetition rate, that is, the magnitude of the ECG signal. Filter 78 functions to filter out the high-frequency harmonics; the filter passes only the frequencies with information content, for example, frequencies below 100 Hz in the case of an ECG signal.

The use of the telephone attachment provides a very simple method of coupling and de-coupling the transmitted signal to and from the telephone link. Furthermore, because voice communication can take place through the attachment, and the coil speaker can be disabled by operating a push button, it is also possible for the patient to communicate simply with his physician. If the patient pushes the button on his attachment, then the FM signal is not coupled to his attachment microphone. In such a case, the 1.2-kHz frequency modulated signal does not interfere with his voice communication. The physician can hear the patient through his attachment. There is no need for him to push his button — unless he wishes to disable his microphone so that the electrical form of the patient's voice signal is not transmitted to the FM demodulator. The physician can also talk to the patient, with the physician speaking into his mouthpiece and the patient listening at his. In this case also, the patient should operate his push button so that the FM signal (in the audio range) does not interfere with the conversation. The telephone attachment of the invention is not only exceedingly cheap to manufacture (as compared, for example, to a conventional data set), but it is also a very simple matter to attach it to or remove it from a telephone. Furthermore, simple push button control allows voice communication to proceed without interference, even though the telephone attachments remain in place.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. A system for transmitting an EKG signal from an ambulatory patient to a remote monitor comprising a portable patient-borne unit carried by said patient for detecting said EKG signal and transmitting a radio-frequency signal representative thereof, a telemetry receiver within range of said patient-borne unit for detecting said radio-frequency signal and for converting it to an audio-frequency electrical signal representative of said EKG signal, a telephone link for extending said audio-frequency electrical signal to said remote monitor, said telephone link including a first telephone, a second telephone, a communication channel therebetween, a pair of electrical-acoustical transducers, each of said transducers including a housing with a speaker contained therein, a first of said transducer housings being placed over the mouthpiece of said first telephone with the telemetry receiver audio-frequency electrical signal being electrically coupled to the respective transducer, the second of said transducer housings being placed over the earpiece of said second telephone with the respective transducer being electrically coupled to said remote monitor, and wherein the transducer attached to the mouthpiece of said first telephone includes an electrical switch which when operated breaks the electrical connection of the transducer, said patient-borne unit further including electrode leads for connection to said patient for detecting an EKG signal, and means for applying the radio-frequency signal to said leads so that said leads further function as an antenna for transmitting said signal.

2. A system in accordance with claim 1 wherein said patient-borne unit includes means for frequency-modulating said radio-frequency signal in accordance with said EKG signal and said telemetry receiver includes means for demodulating the detected radio-frequency signal for deriving therefrom said audio-frequency electrical signal.

3. A system in accordance with claim 1 wherein said patient-borne unit includes means for frequency modulating a sub-carrier in accordance with the amplitude of said EKG signal and means for frequency modulating a radio-frequency carrier in accordance with said frequency modulated sub-carrier, and said telemetry receiver includes means for demodulating the detected radio-frequency signal for deriving therefrom a frequency-modulated audio electrical signal for transmission over said telephone link.

4. A system in accordance with claim 3 wherein the frequency of said sub-carrier is in the audio range.

5. A system in accordance with claim 4 wherein said remote monitor includes means for demodulating the frequency-modulated signal transmitted over said telephone link to derive therefrom said EKG signal.

6. A system in accordance with claim 5 wherein each of said attachments fits over and covers the mouthpiece or the earpiece of a telephone and includes a plurality of through-holes in its housing for permitting acoustical communication between the exterior of the housing and the covered mouthpiece or earpiece.

* * * * *